June 23, 1931.　　　　K. KUEHN　　　　1,811,796
DRIVING CRANK FOR PISTON ENGINES
Filed Jan. 18, 1929
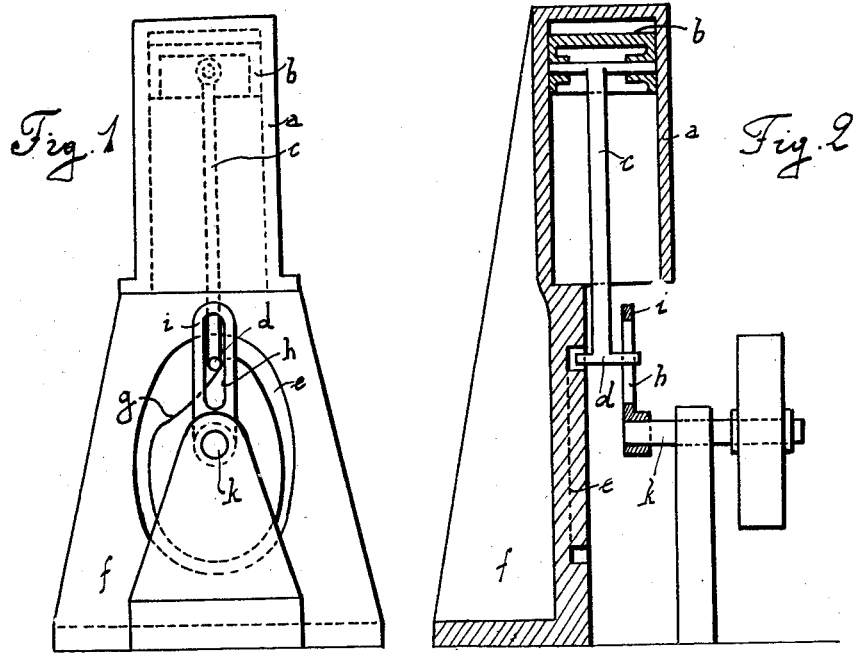
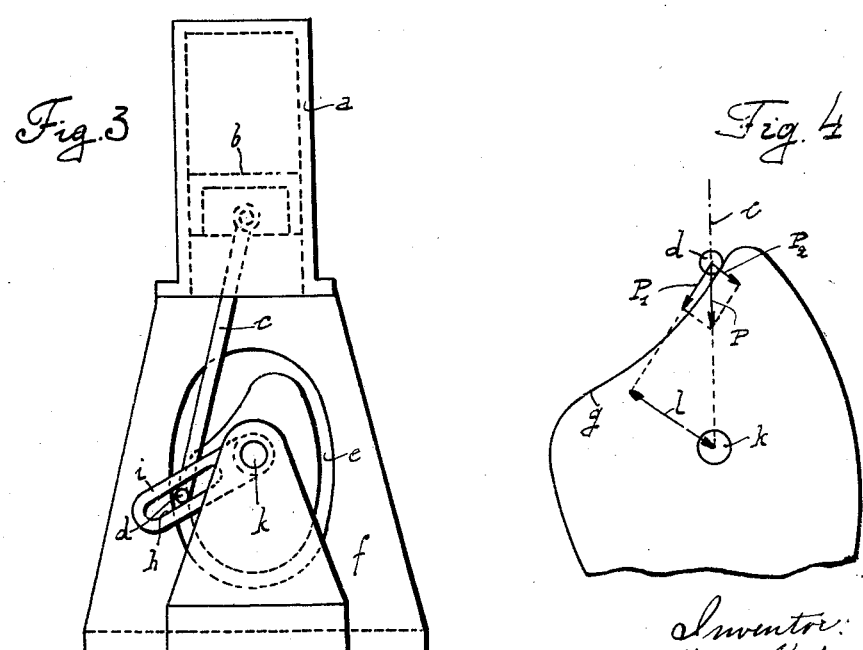
Inventor:
Karl Kuehn,
By Lanyon, Parry, card Lanyon
Attys.

Patented June 23, 1931

1,811,796

UNITED STATES PATENT OFFICE

KARL KUEHN, OF COLOGNE, GERMANY

DRIVING CRANK FOR PISTON ENGINES

Application filed January 18, 1929, Serial No. 333,445, and in Germany January 25, 1928.

The usual driving crank for piston engines has the disadvantage to produce at the dead points great momentum of flexion in this crank. In order to remedy this disadvantage, it has been experimented to guide the head of the connecting rod on one side in a fixed curved groove and on the opposite side in a longitudinal groove of the crank of the engine. This arrangement permits one of the dead points between the piston and the connecting rod to lead or lag with respect to the other one but, because of the form of the guiding way the length of the stroke is shortened and the power of engine reduced.

The object of the invention is to remedy this disadvantage by guiding the head of the connecting rod into a guiding groove having in the direction of the piston stroke the shape of a pear slightly curved on a part of the working-stroke, in order that when the piston begins its working-stroke a lateral component is produced which is tangent to the guiding groove and which transmits to the driving crank a powerful rotating momentum.

The annexed drawings represent the invention in a form of execution.

Fig. 1 shows a side view of the engine.

Fig. 2 is a sectional view of the Fig. 1.

Fig. 3 shows the same view as in Fig. 1, the moveable pieces being in another position.

Fig. 4 is a general view of the forces.

The cylinder $a$ into which slides the piston $b$ may be the cylinder of a steam engine or the one of an internal combustion engine. The connecting rod $c$, coupled with the piston, is guided by a pear-shaped guiding groove $e$, forming a part of a fixed frame $f$. The guiding groove $e$ has in the direction of the longitudinal axle of the engine, that is to say in the direction of the piston stroke, the shape of a pear and has a slight curve $g$ at the upper part. The head of the connecting rod also slides into the groove $h$ of the crank $i$ of the driving shaft $k$.

In Fig. 1 the position of the upper dead point of the piston $b$, that is to say when the connecting rod $c$ has reached its stroke's end, the head of the connecting rod $d$ is already on the beginning of the curved guiding groove $g$. According, the force P directed towards the bottom is decomposed into two components $P_1$ and $P_2$ respectively tangent and perpendicular to the guiding groove. Whilst the perpendicular component $P_2$ is rendered null by reaction of the guiding groove, the tangential component $P_1$, which moves the driving shaft $k$ with a lever's arm $l$, causes the deviation of the crank $i$ and exercises by this fact, already at the dead point, a powerful rotating momentum upon the driving shaft. By the form of a pear and the curve $g$ of the guiding groove, it is possible to give, for any position of the crank, a determined value to the rotating momentum. By making an adequate choice of the pearform of the guiding groove a shortening of the piston stroke is avoided and no lengthened stop of the piston at the dead points is produced.

What I claim is:

1. In a piston engine, a rod with its foot connected to the piston, means for guiding the head end of said rod including a fixed curved cam groove and a crank connected loosely to the rod head, said cam groove having an incurved part situated on the side corresponding to the drive stroke of the active surface of the piston and beginning in the direction of rotation at a point located slightly in front of the line of the dead points of said piston, said part forming a small angle with the line of the dead points.

2. In a piston engine, a rod connected by its foot to the piston, means for guiding the head end of said rod including a fixed curved cam groove and a crank connected loosely to the head of said rod, said cam groove having an incurved part located on the side corresponding to the drive stroke of the active surface of the piston and beginning in the direction of rotation at a point located slightly in front of the line of the dead points of said piston, said part forming with the line of the tangent to the different points of said part forming with the direction of the line of said dead points an angle, which angle increases with the points of tangency taken successively in the direction of rotation.

In testimony whereof I have affixed my signature.

KARL KUEHN.